United States Patent
Tao (10) Patent No.: US 8,023,143 B2
(45) Date of Patent: Sep. 20, 2011

(54) IMAGE-FORMING SYSTEM AND IMAGE-FORMING PROGRAM

(75) Inventor: Kozo Tao, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 908 days.

(21) Appl. No.: 11/433,326

(22) Filed: May 12, 2006

(65) Prior Publication Data

US 2007/0097434 A1 May 3, 2007

(30) Foreign Application Priority Data

Nov. 1, 2005 (JP) ................................. 2005-318185
Nov. 1, 2005 (JP) ................................. 2005-318186

(51) Int. Cl.
*G06K 15/00* (2006.01)

(52) U.S. Cl. ..................... 358/1.16; 358/1.14; 358/450

(58) Field of Classification Search ........ 358/1.16–1.17, 358/425
See application file for complete search history.

(56) References Cited

U.S. PATENT DOCUMENTS

| | | | | |
|---|---|---|---|---|
| 4,203,154 | A * | 5/1980 | Lampson et al. | 345/26 |
| 4,607,138 | A | 8/1986 | Suzuki et al. | |
| 5,604,847 | A * | 2/1997 | Dennis et al. | 358/1.17 |
| 5,825,994 | A * | 10/1998 | Kumada | 358/1.17 |
| 5,835,104 | A * | 11/1998 | Hicok et al. | 345/568 |
| 5,959,744 | A * | 9/1999 | Kohri et al. | 358/450 |
| 6,040,917 | A * | 3/2000 | Campbell et al. | 358/1.17 |
| 6,128,096 | A * | 10/2000 | Furuya et al. | 358/1.17 |
| 6,542,255 | B1 * | 4/2003 | Nakamura | 358/1.17 |
| 6,574,003 | B1 * | 6/2003 | Kakuno | 358/1.13 |
| 6,963,412 | B1 * | 11/2005 | Toda | 358/1.13 |
| 7,308,155 | B2 * | 12/2007 | Terada | 382/284 |
| 7,443,519 | B1 * | 10/2008 | Kakuno | 358/1.13 |
| 2001/0056449 | A1 | 12/2001 | Kawamoto et al. | |
| 2002/0063894 | A1 | 5/2002 | Campbell et al. | |

FOREIGN PATENT DOCUMENTS

| | | |
|---|---|---|
| JP | 2000-079731 | 3/2000 |
| JP | 2000-238349 | 9/2000 |
| JP | 2000-301781 | 10/2000 |
| JP | 2001-001579 | 1/2001 |
| JP | 2001-071602 | 3/2001 |
| JP | 2001-092610 | 4/2001 |
| JP | 2001-171185 | 6/2001 |
| JP | 2002-014797 | 1/2002 |
| JP | 2003-72161 | 3/2003 |
| JP | 2003-80771 | 3/2003 |

* cited by examiner

*Primary Examiner* — Chan S Park
*Assistant Examiner* — Richard Zhu
(74) *Attorney, Agent, or Firm* — Jordan and Hamburg LLP (57) ABSTRACT

An image-forming system prevents a print overrun error even if there are bands of divided data having different band heights. An image-forming system has a band divider to divide image data into a plurality of bands each containing divided image date, a loader to load the bands into a band memory, and an output unit to sequentially output the bands from the band memory to a print engine at predetermined timing. The band divider can change the height of at least one of the bands from the height of the remaining bands. The band memory includes VRAMs into which a band of bitmap data whose band height is higher than a threshold is loaded and an auxiliary VRAM (VRAM-special) into which a band of bitmap data whose height has been changed.

12 Claims, 6 Drawing Sheets

IMAGE-FORMING SYSTEM AND IMAGE-FORMING PROGRAM

BACKGROUND OF THE INVENTION

1. Field of the Invention

The present invention relates to an image-forming system such as a printer connected to a host device such as a host computer and an image-forming program.

2. Description of Related Art

An image-forming system according to a related art has a restriction of memory capacity, and therefore, divides image data into a plurality of bands each containing divided bitmap data. The bands of divided bitmap data are successively loaded into, for example, band memories 1 and 2. For example, first and second bands are loaded into the band memories 1 and 2, and thereafter, the first band is transferred from the band memory 1 to a print engine. Thereafter, a third band is loaded into the band memory 1 by overwriting the first band existing in the band memory 1. The first band transferred to the print engine is printed on a sheet of paper. All the bands are transferred to the print engine to be printed like wise manner.

The image-forming system may read a plurality of image data pieces, enlarge or reduce the read data pieces, combine the enlarged or reduced data pieces into one, and print the combined data piece on a single sheet of paper. This process is called an N-up process. The N-up or the like process needs a large processing capacity to limit the processing speed of the image-forming system.

Figure 7:
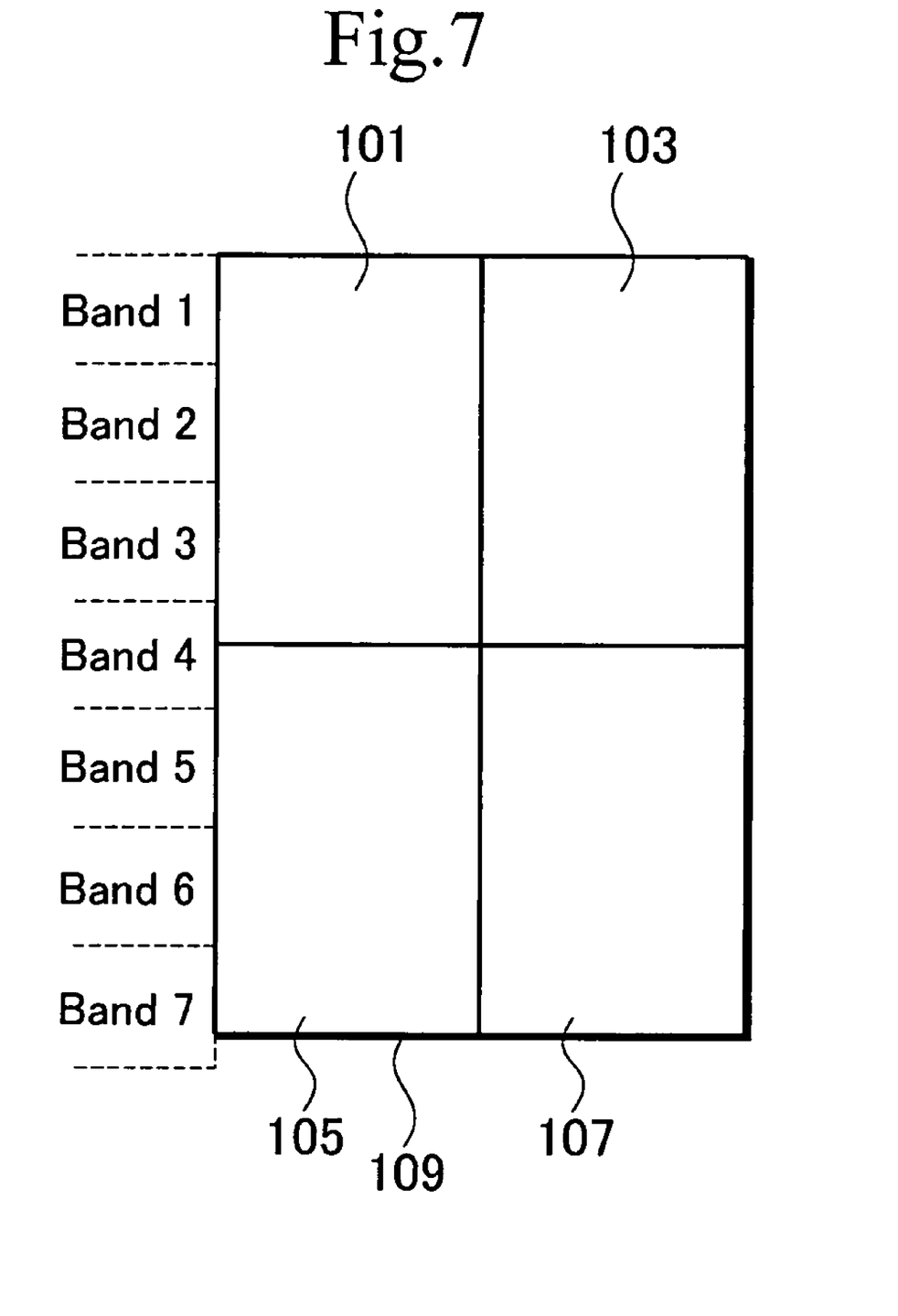
FIG. 7 is a view explaining a band process achieved during 4-in-1 printing (a kind of N-up process) according to a related art.

FIG. 7 explains the N-up process, in particular, a 4-up process that conducts 4-in-1 printing. In FIG. 7, four image data pieces 101, 103, 105, and 107 are scanned and read one by one, are reduced, and are stored in a memory. The reduced data pieces 101, 103, 105, and 107 are combined into one data piece having a final image size of A4 (Japanese Industrial Standard). The final data piece is stored in a memory region whose size corresponds to the size of A4 paper. The combined data piece is divided into bands 1 to 7 each containing divided bitmap data. The bands are sequentially transferred to a print engine and are printed as mentioned above.

Rearranging the final image in the memory region into bands increases the number of processes and delays a processing speed.

In FIG. 7, a data end 109 of the image is in the middle of the band 7 as a last one of the divided bands. It is necessary, therefore, to memorize the location of the data end 109 in the band 7 so that nothing is printed after the data end 109. This further increases the number of processes and delays a processing time.

To increase a processing speed, there is a technique to change the height of one band. This technique, however, is not effective for the N-up process or when a data end is in the middle of a band because the above-mentioned data rearranging process and data end memorizing process are needed in such a case.

Changing the heights of some bands causes an incident that a band of higher height must be loaded into a band memory within a short period in which a band of lower height is output to a print engine. Then, the band of higher height is not completely loaded into the band memory within the period, to cause a print overrun error. (Refer to Japanese Unexamined Patent Application Publications No. 2000-301781, No. 2001-171185, No. 2003-80771, and No. 2003-72161.)

SUMMARY OF THE INVENTION

An object of the present invention is to provide an image-forming system and an image-forming program, capable of speedily carrying out the N-up process and other processes in a printer or the like. Another object of the present invention is to provide an image-forming system capable of preventing a print overrun error even if there are bands having different heights.

In order to accomplish the objects, a first aspect of the present invention provides an image-forming system having a band divider that divides image data into bands so that an end of the image data agrees with the boundary of a last one of the bands, to thereby improve a processing speed.

The first aspect divides image data into bands and adjusts the height of a last one of the bands. When carrying out the N-up process, the first aspect needs no special processes for the last band such as forming a final image in a memory region and rearranging the final image in the memory region into bands. Accordingly, the first aspect can increase a processing speed.

A second aspect of the present invention provides an image-forming system having a band divider that divides image data into bands so as to change the height of at least one of the bands from the height of the remaining bands and a band memory including a main part into which the remaining bands are loaded and an auxiliary part into which the band, whose height is changed, is loaded.

The second aspect can smoothly load image data divided into bands of different heights, which may include a short height involving a short transfer time, into the band memory, thereby preventing a print overrun error.

DETAILED DESCRIPTION OF EMBODIMENTS

An image-forming system according to an embodiment of the present invention will be explained. This system realizes a high-speed operation by making an end of image data agree with the boundary of a last band that corresponds to an end piece of divided image data. The system employs an auxiliary memory to prevent a print overrun error even if there are bands of divided image data having different heights.

[Image-Forming System]

Figure 1:
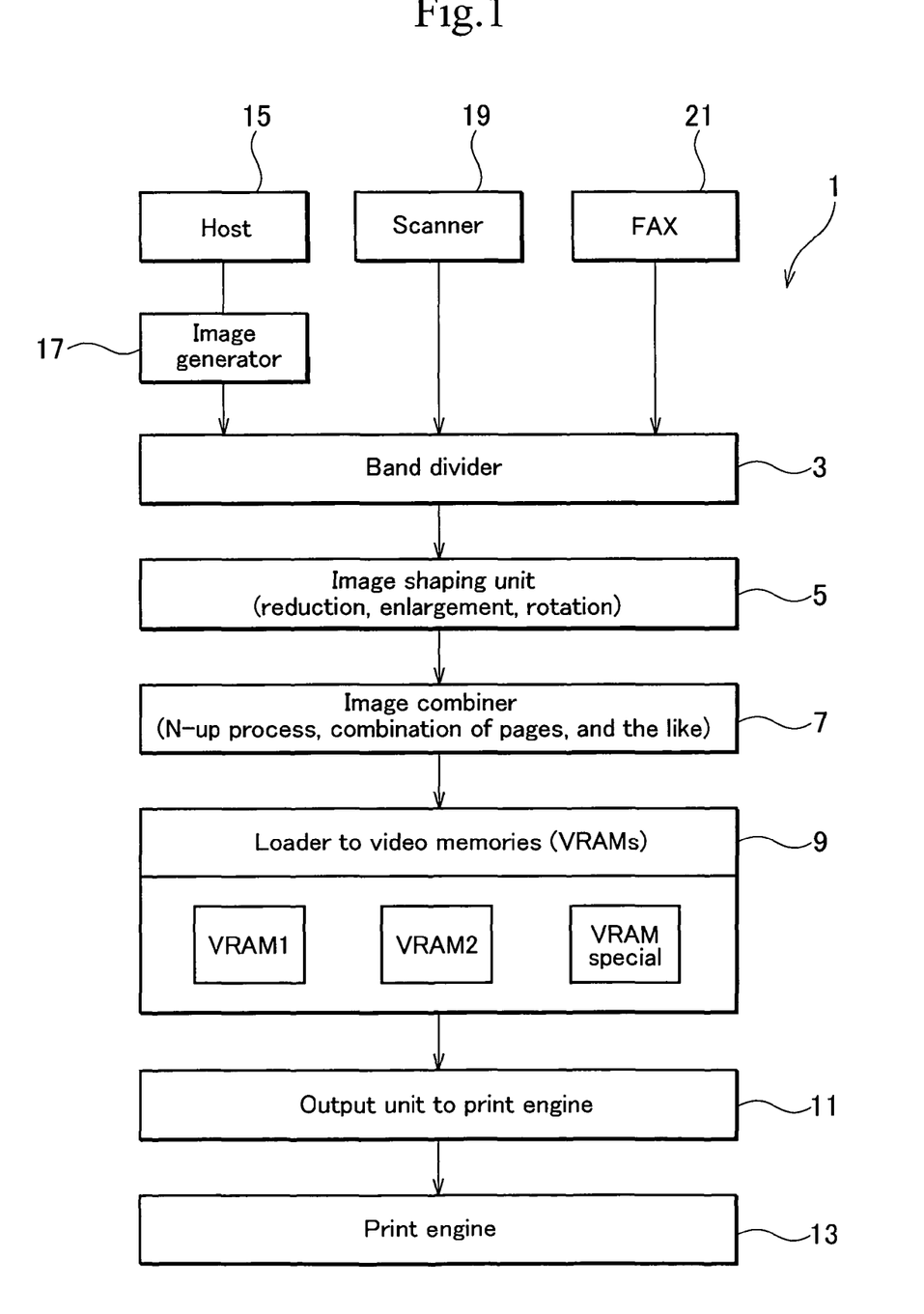
FIG. 1 is a block diagram showing an image-forming system according to an embodiment of the present invention.

FIG. 1 is a block diagram showing an image-forming system according to an embodiment of the present invention.

In FIG. 1, the image-forming system 1 is a printer or a hybrid device having a print engine and a controller such as a computer. The controller includes hardware and organized with a main board on which a CPU (central processing unit), ROMs (read-only memories), RAMs (random access memories), control LSIs (large-scale integrated circuits), interfaces, and the like are mounted. The controller carries out operations according to an image-forming program stored in the ROMs and makes the print engine conduct a printing operation. The details of the image-forming program will be explained later.

The hardware organization and image-forming program in the image-forming system 1 realize a band divider 3, an image shaping unit 5, an image combiner 7, a loader 9, and an output unit 11. In addition, the image-forming system 1 has the print engine 13.

The band divider 3 receives image data from an image generator 17, a scanner 19, and a facsimile 21. The image generator 17 is connected to a host computer 15. The band divider 3 divides the received image data into a plurality of bands each containing divided bitmap data. At this time, the band divider 3 aligns an end of the read image data with the boundary of a last band. Namely, the band divider 3 can vary the height of the last band. The details of this will be explained later. The band divider 3 sends the bands of divided bitmap data to the image shaping unit 5.

The image shaping unit 5 reduces, enlarges, or rotates the image and sends the bands of bitmap data to the image combiner 7.

The image combiner 7 carries out an N-up process so that the bands of bitmap data may be printed on a single piece of paper. For this, the image combiner 7 combines the bands in a main scanning direction and sends the combined bands to the loader 9. According to this embodiment, the main scanning direction is the same meaning as a direction orthogonal to a sheet feeding direction.

The loader 9 sequentially loads the bands into a band memory, from which the bands are sequentially sent to the output unit 11. The band memory is comprised of a main video memory and an auxiliary video memory. According to this embodiment, the main video memory includes two video random access memories VRAM 1 and VRAM 2 each capable of storing a band whose height is greater than a threshold N. Particularly, the VRAMs 1 and 2 store the bands excepting the last band. The auxiliary video memory according to this embodiment is a single video random access memory VRAM-special capable of storing a band whose height is equal to or smaller than the threshold N. Particularly, the VRAM-special stores the last band.

Namely, the loader 9 successively loads all bands as the remaining bands except the last band as one band into the VRAMs 1 and 2 and the last band into the VRAM-special.

The output unit 11 sequentially outputs, at predetermined timing, the bands in the video memories to the print engine 13.

The print engine 13 prints the output bands on a sheet of paper.

In this way, the band divider 3 divides image data into bands each containing divided bitmap image data. The image shaping unit 5 and image combiner 7 scale and combine the bands of image data, and the loader 9 loads the bands of image data into the video memories band by band. The output unit 11 outputs the bands from the video memories to the print engine 13 that prints the bands of image data on a sheet of paper.

[Band Boundary]

Figure 2:
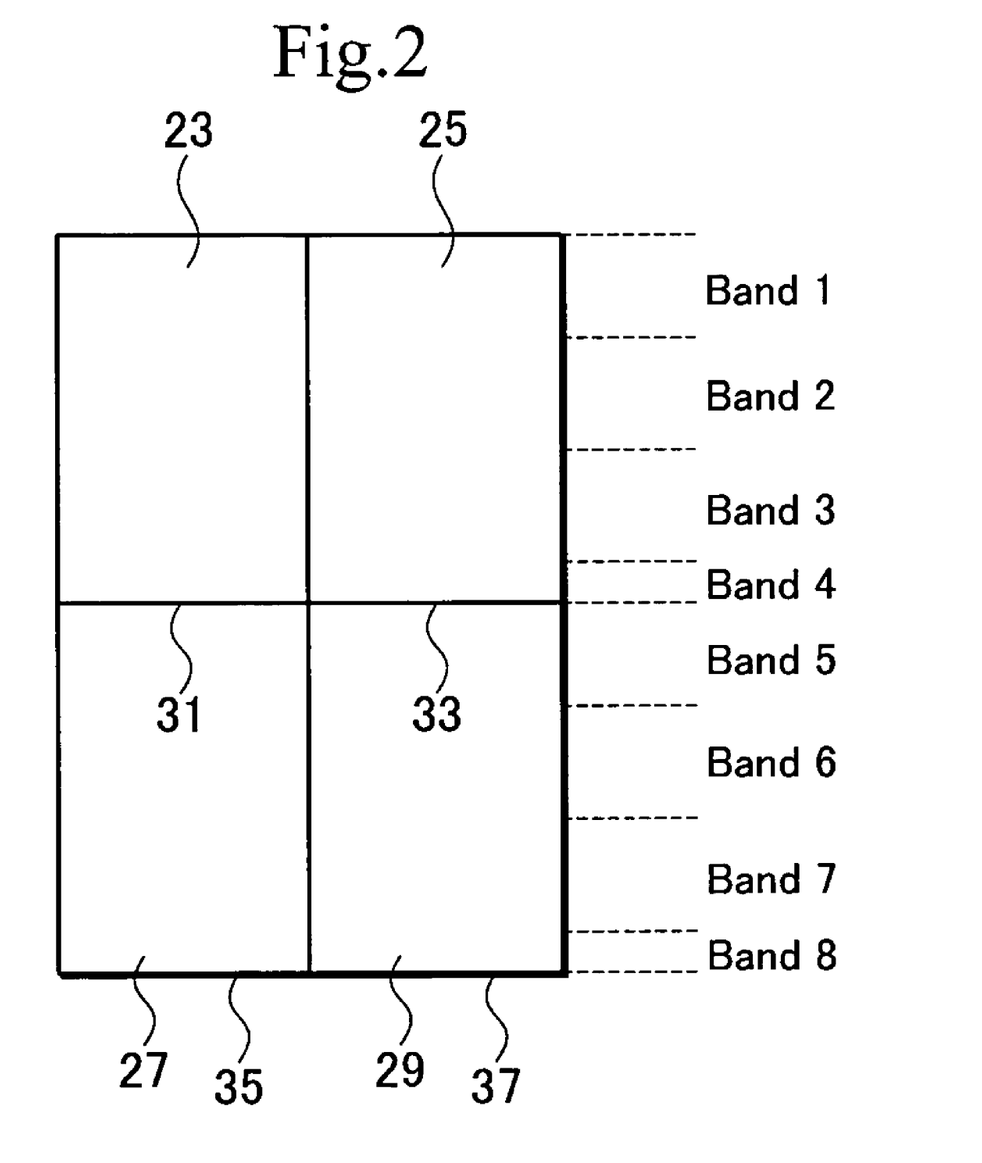
FIG. 2 is a view explaining band boundaries formed during an N-up process carried out in the system of FIG. 1.
Figure 3:
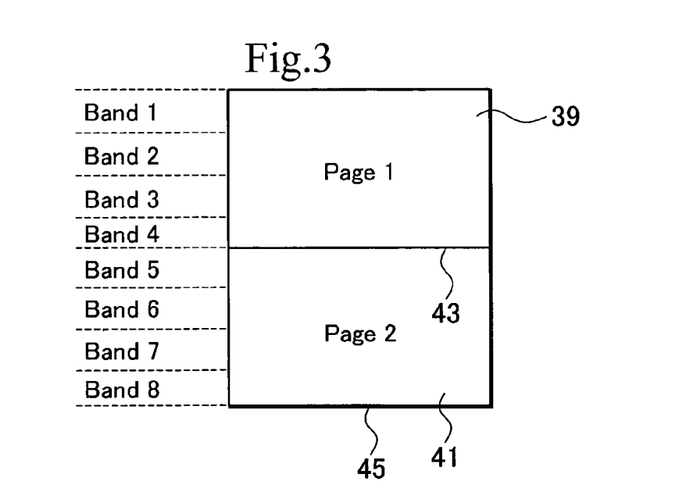
FIG. 3 is a view explaining band boundaries formed during another N-up process carried out in the system of FIG. 1.

FIGS. 2 and 3 show examples of band boundaries formed during an N-up process. FIG. 2 shows a 4-up process and FIG. 3 shows a 2-up process.

According to the 4-up process of FIG. 2, four image data pieces 23, 25, 27, and 29 are scanned one by one and are read into the image-forming system 1. The read image data pieces 23, 25, 27, and 29 are divided into bands 1 to 8 each containing divided bitmap image data. Bands for two pages in a main scanning direction or a laser moving direction are combined together. Bands are not combined in a secondary scanning direction orthogonal to the main scanning direction. Namely, the bands derived from the image data pieces 23 and 25 are reduced and are combined in the main scanning direction, and the bands derived from the image data pieces 27 and 29 are reduced and are combined in the main scanning direction.

Ends 31, 33, 35, and 37 of the read image data pieces 23, 25, 27, and 29 are set as the boundaries of last ones of the bands divided from the data pieces 23, 25, 27, and 29. The height of the last bands 4 and 8 is lower than the height of the other bands.

According to the 2-up process of FIG. 3, two image data pieces 39 and 41 are scanned one by one and are read into the image-forming system 1. The read data pieces 39 and 41 are divided into bands 1 to 8 each containing divided bitmap image data. The 2-up process combines no bands.

Ends 43 and 45 of the read image data pieces 39 and 41 are set as the boundaries of last ones of the bands divided from the data pieces 39 and 41. The height of the last bands 4 and 8 is lower than the height of the other bands.

[Data Load and Output]

Figure 4:
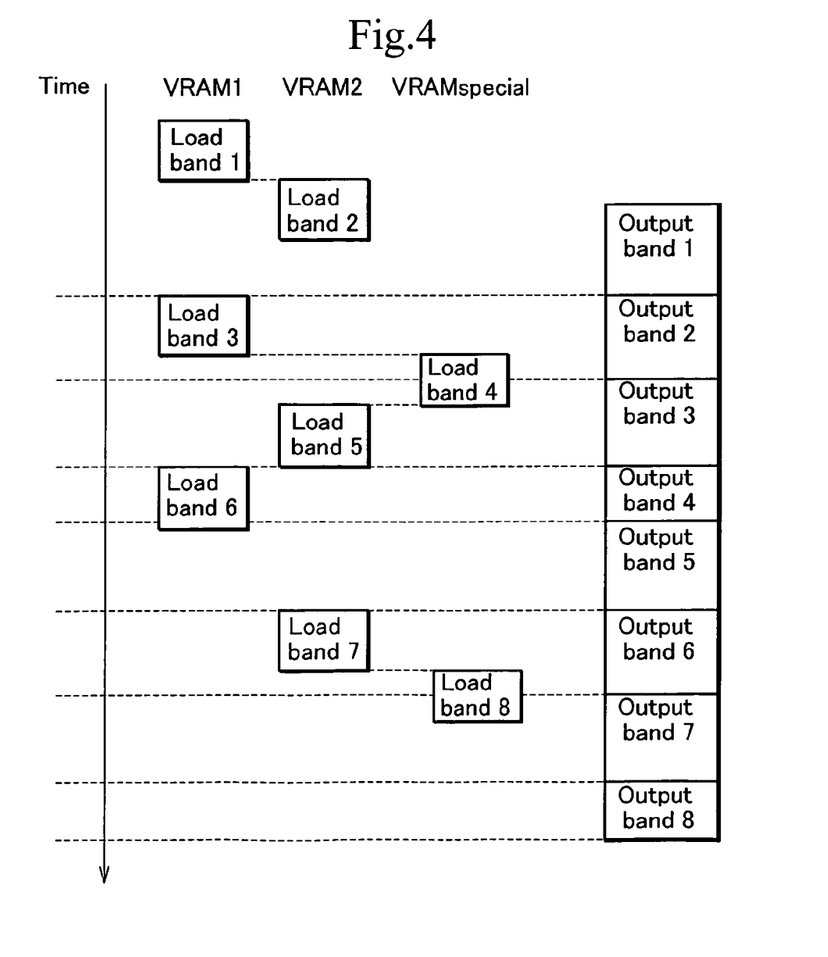
FIG. 4 is a timing chart showing the band-by-band loading of bitmap data into video memories and the outputting of the loaded data to a print engine according to an embodiment of the present invention.

FIG. 4 is a timing chart showing the loading of bands into the video memories band by band and the outputting of the loaded bands to the print engine. In FIG. 4, an ordinate represents time.

In FIG. 4, the loader 9 successively loads bands one by one into the VRAM 1, VRAM 2, and VRAM-special, and at the timing shown in FIG. 4, the output unit 11 outputs the loaded data to the print engine 13. Namely, the completion of a loaded band output triggers the loading of a next un-loaded band.

First, the bands 1 and 2 of divided bitmap data are sequentially loaded into the VRAMs 1 and 2. Thereafter, the loading of a band into one of the video memories is carried out whenever a band is output to the print engine 13.

The bands of divided bitmap data are sequentially output from the video memories to the print engine 13 from the band 1. Namely, when the band 1 is completely output to the print engine 13, the band 2 is output to the print engine 13, and at the same time, the bitmap data of the band 3 is loaded into the VRAM 1.

After the band 2 is completely output to the print engine 13, the band 3 is output to the print engine 13.

After the loading of the band 3, the bitmap data of the band 4 is loaded into the VRAM-special.

After outputting the band 2 and after loading the band 4, the bitmap data of the band 5 is loaded into the VRAM 2.

After outputting the band 3, the band 4 is output to the print engine 13, and at the same time, the bitmap data of the band 6 is loaded into the VRAM 1.

After outputting the band 4, the band 5 is output to the print engine 13. Before the completion of outputting the band 5, the loading of the band 6 is completed.

After outputting the band 5, the band 6 is output to the print engine 13, and at the same time, the bitmap data of the band 7 is loaded into the VRAM 2.

After loading the band 7, the bitmap data of the band 8 is loaded into the VRAM-special.

After outputting the band 6, the bands 7 and 8 are successively output to the print engine 13.

According to this embodiment, the band 5 is loaded not within the short output time of the band 4 but it is loaded with the use of the long output time of the band 3. This is achievable because the band 4 is loaded into the VRAM-special instead of the VRAM 1 or 2. Also, the band 6 is loaded not within the short output time of the band 4 alone but it is loaded within the long output time of a combination of the bands 4 and 5. In this way, this embodiment can smoothly load and output bands of divided bitmap image data, thereby preventing a print overrun error.

If there is no VRAM-special, the band 4 must be loaded into the VRAM 2, and the band 5 must be loaded within the short output time of the band 4. As a result, loading the band 5 within the short output time of the band 4 fails and causes a print overrun error.

In this way, the above-mentioned embodiment loads a low-height band of bitmap data into the VRAM-special, to surely prevent a print overrun error.

[Image-Forming Process]

Figure 5:
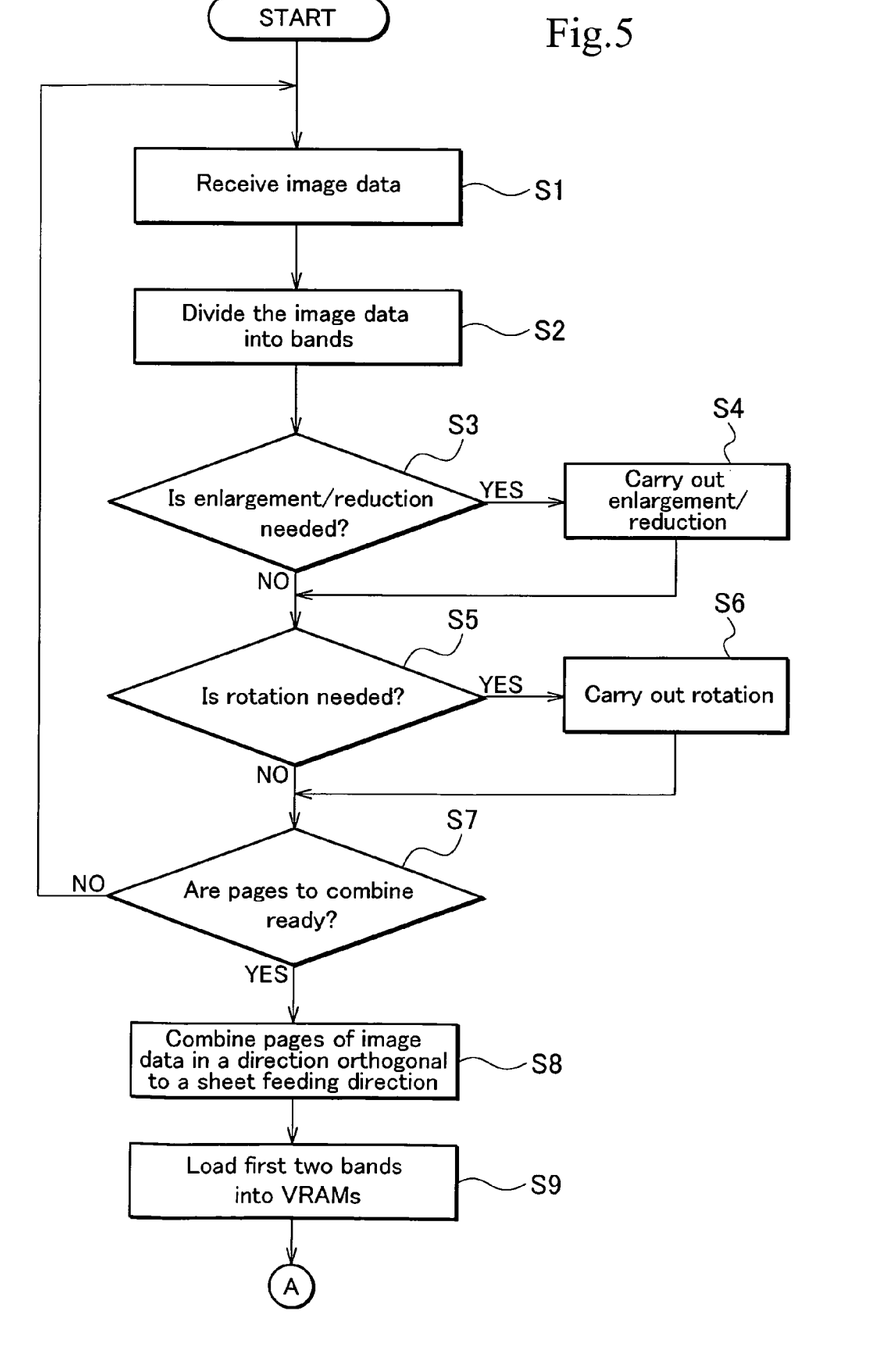
FIGS. 5 and 6 are flowcharts showing an image-forming process according to an embodiment of the present invention.
Figure 6:
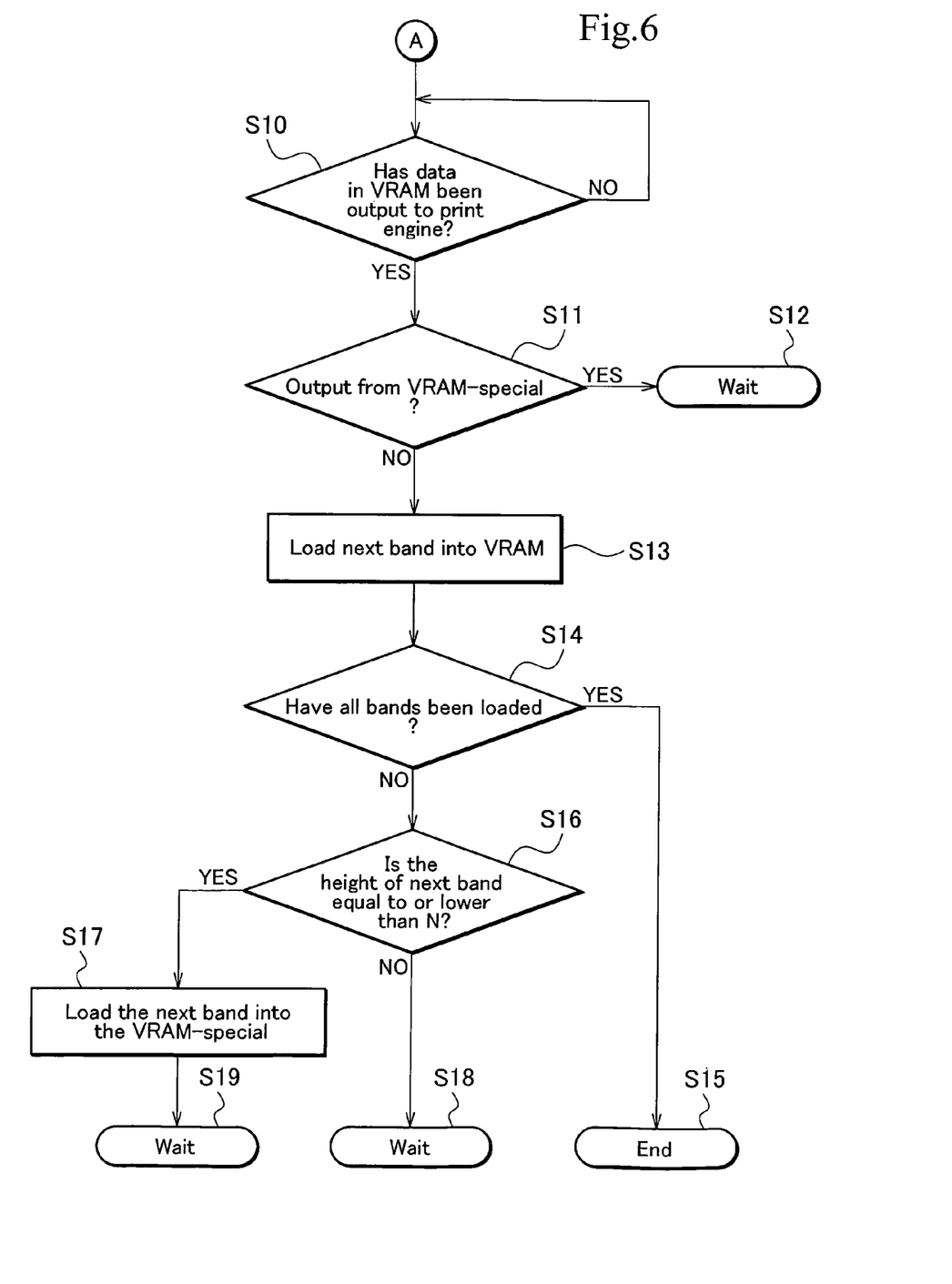

FIGS. 5 and 6 are flowcharts showing an image-forming process according to an embodiment of the present invention. The image-forming process will be explained with reference to FIGS. 5 and 6 as well as the example of FIG. 4.

The process starts when the image generator 17, for example, outputs image data to the band divider 3.

In step S1, the image data are input into the image-forming system 1 and the input image data are transferred to and received by the band divider 3.

In step S2, the band divider 3 divides the image data into a plurality of bands each containing divided bitmap image data.

Step S3 determines whether or not the image data must be reduced or enlarged for an N-up process. If reduction or enlargement is needed (YES), step S4 is carried out, and if not (NO), step S5 is carried out. If two image data pieces each of A4-size (Japanese Industrial Standard) are printed on a single sheet of paper of A4-size in the example of FIG. 3, step S4 is carried out to conduct a reduction operation.

In step S4, a reduction/enlargement operation is conducted. When printing two image data pieces each of A4-size on a single sheet of paper of A4-size, each A4 image data piece is reduced into an image data piece of A5-size (Japanese Industrial Standard), and step S5 is carried out. When printing two A6-size (Japanese Industrial Standard) image data pieces on an A4 sheet, the A6-size image data pieces are each enlarged to an A5-size.

In step S5, it is determined whether or not a rotation operation is needed. The rotation is carried out when, for example, orienting image data pieces for an N-up process. If rotation is needed (YES), step S6 is carried out, and if not (NO), step S7 is carried out.

Step S6 carries out a rotational operation to adjust the orientation of each image data piece for an N-up process. Thereafter, step S7 is carried out.

In step S7, it is determined whether or not all pages to be combined together are present for an N-up process. If there are a required number of pages for an N-up process (YES), step S8 is carried out, and if not (NO), the steps starting from step S1 are repeated.

Step S8 combines image data pieces to be adjacent to each other in the direction orthogonal to a sheet feeding direction. In the 4-up process of FIG. 2, the image data pieces 23 and 25 are combined band by band and the image data pieces 27 and 29 are combined band by band. Thereafter, step S9 is carried out. In the 2-up process of FIG. 3, there are no data pieces that are adjacent to each other in the direction orthogonal to the sheet feeding direction, and therefore, no combining operation is carried out before proceeding to step S9.

In step S9, first two bands are loaded into the VRAMs. In the example of FIG. 4, the bands 1 and 2 are loaded into the VRAMs 1 and 2, and step S10 is carried out.

In step S10, it is determined whether or not if a given band has been output from the VRAMs to the print engine 13. Namely, the bands 1 to 8 shown in FIG. 4 are checked one by one whether or not it has been output to the print engine 13, and if a given band is not output yet (NO), step S10 is continuously carried out. If the given band has been output to the print engine 13, an output completion signal is issued and step S11 is carried out. The output completion signal is used as a trigger to load the next band into the VRAMs as shown in FIG. 4.

When step S10 determines that the band 1 has been output to the print engine 13, step S11 is carried out.

In step S11, it is determined whether or not the output is from the VRAM-special. Namely, step S11 checks to see if the output in step S10 has been made from the VRAM 1 or 2 or from the VRAM-special. If it has been from the VRAM-special (YES), step S12 is carried out, and if it has been from the VRAM 1 or 2 (NO), step S13 is carried out. In this example (FIG. 4), the band 1 has been output from the VRAM 1, and therefore, step S13 is carried out.

In step S13, the next band is loaded into the VRAM in question. In the example of FIG. 4, outputting the band 1 to the print engine 13 serves as a trigger to load the band 3 as the next un-loaded band that is not loaded yet into the VRAM 1 by overwriting the band 1, and step S14 is carried out.

In step S14, it is determined whether or not all of the bands 1 to 8 have been loaded into the VRAMs. If it is so (YES), step S15 is carried out to end the process, and if not (NO), step S16 is carried out. In this example (FIG. 4), only the band 1 has been completely output, i.e. loading all the bands 1 to 8 is not complete, and therefore, step S16 is carried out.

In step S16, it is determined whether or not the height of the next un-loaded band is equal to or less than a threshold N. Namely, step S16 checks to see if the next un-loaded band is the band 4 or 8 whose height is lower than the threshold N. If the height is equal to or lower than the threshold N (YES), step S17 is carried out, and if not (NO), step S18 is carried out. In this example (FIG. 4), the next un-loaded band that follows the band 3 loaded in step S13 is the band 4 whose height is lower than the threshold N, and therefore, step S17 is carried out.

In step S17, the band whose height is equal to or lower than the threshold N is loaded into the VRAM-special. In this example (FIG. 4), the band 4 is loaded into the VRAM-special, and step S19 is carried out.

In step S19, a wait operation is carried out so that the band 4 is completely loaded as shown in FIG. 4. Thereafter, the flow returns to step S10.

The resumed step S10 checks to see if the band 2 has been output to the print engine 13. If it has been output, steps S11 and S13 are carried out. In step S13, the band 5 as the next un-loaded band is loaded into the VRAM 2, and steps S14 and S16 are carried out.

In step S16, the band 6 as the next un-loaded band and is next to the band 5 loaded in step S13 has a height exceeding the threshold N, and therefore, step S18 is carried out.

In step S18, a wait operation is executed so that the band 5 is completely loaded as shown in FIG. 4. Thereafter, step S10 is again carried out.

Step S10 checks to see if the band 3 already loaded has been output to the print engine 13. If it has been output, steps S11 and S13 are carried out. In step S13, the next un-loaded band 6 is loaded into the VRAM 1, and steps S14, S16, and S18 are carried out.

In step S18, a wait operation is executed so that the band 6 is completely loaded. Thereafter, step S10 is again carried out.

In step S10, it is checked to see if the band 4 has been output to the print engine 13. If it has been completely output, step S11 is carried out. In step S11, it is determined that the band 4 just output is from the VRAM-special, and step S12 is carried out.

Step S12 executes a wait operation, and step S10 is again carried out.

In step S10, it is checked to see if the next loaded band 5 has been output to the print engine 13. If it has been output, steps S11 and S13 are carried out. In step S13, the band 7 as the next un-loaded band is loaded into the VRAM 2, and steps S14, S16, and S17 are carried out.

In step S17, the band as the next un-loaded band is loaded into the VRAM-special, and step S19 is carried out.

Step S19 executes a wait operation so that the band 8 is completely loaded. Thereafter, step S10 is again carried out.

In step S10, it is checked to see if the loaded band 6 has been output to the print engine 13. If it has been output, steps S11, S13, and S14 are carried out. Since the band 8 has been loaded in step S14, step S15 is carried out to end the loading process.

After the completion of the output of the band 6 to the print engine 13, the bands 7 and 8 are successively output to the print engine 13 to finish the printing work.

The steps shown in the flowcharts of FIGS. 5 and 6 are realized with an image-forming program that is executed in the image-forming system 1 according to the present invention.

The image-forming program makes the controller (for example, a computer) of the image-forming system 1 execute the dividing step S2 to divide image data into a plurality of bands each containing divided bitmap image data, the loading steps S13 and S17 to load the bands into the band memory, and the output step S10 to sequentially output the bands to the print engine 13 at predetermined timing.

The dividing step S2 sets an end of the image data as the boundary of a last one of the bands.

The loading step S13 is a main loading step to load bands except the last band into the VRAMs 1 and 2 that are main video memories. The loading step S17 is an auxiliary loading step to load the last band into the VRAM-special that is an auxiliary video memory.

The auxiliary loading step S17 loads a band whose height is equal to or smaller than a threshold N into the VRAM-special.

To print a plurality of image data pieces on a single sheet of paper, the image combining step S8 combines bands divided from the image data pieces in a direction orthogonal to a sheet feeding direction into a combined image.

[Effect]

The image-forming system 1 according to the embodiment mentioned above of the present invention sets an end of an image data piece as the boundary of a last one of bands that are divided from the image data piece. Therefore, the system 1 only has to read an image data piece and divide the data piece into a plurality of bands, and it can set the height of a last one of the bands according to an end of the data piece. The system 1 can carry out an N-up process without forming a final image combining all the image data pieces 23, 25, 27, and 29 together in a memory region and rearranging the final image into bands or without specially processing image data in the last band. Accordingly, the system 1 achieves a high processing speed.

To print a plurality of image data pieces on a single sheet of paper, the image-forming system 1 according to the present invention has the image combiner 7 that combines divided image pieces in the main scanning direction into a combined image. The image combiner 7 enables to speedily and smoothly carry out an N-up process.

The image-forming program executed in the image-forming system 1 according to the present invention includes the dividing step S2 to divide image data into a plurality of bands each containing divided bitmap image data, the loading steps S13 and S17 to load the bands into a band memory, and the output step S10 to sequentially output the bands from the band memory to a print engine at predetermined timing. The dividing step S2 sets an end of the image data as the boundary of a last one of the bands. The program can carry out an N-up process without forming a final image and rearranging the final image into bands or without specially processing image data in the last band. The program, therefore, can improve the processing speed of a computer that executes the program.

To print a plurality of image data pieces on a single sheet of paper, the image-forming program includes the image combining step S8 to combine bands divided from the image data pieces in the main scanning direction into a combined image. This step helps the computer speedily and smoothly executing an N-up process.

In the image-forming system 1 according to the present invention, the band divider 3 can change the height of a last band corresponding to an end of an image data piece from the height of the remaining bands. In the system 1, the band memory is comprised of the VRAMs 1 and 2 into which bands of normal height are loaded and the VRAM-special into which a height variable last band is loaded. Even if a short output time occurs due to a band having a lower height, the bands of the normal height are surely loaded into the VRAMs 1 and 2, and therefore, no print overrun error will occur.

Although the embodiment has been mainly explained in connection with an N-up process, the present invention is also useful to speed up a normal printing process because the present invention eliminates the processing of the end of a given divided data piece.

According to an embodiment of the present invention, the height of not only a last band but also a given intermediate band is changeable. Namely, two or more bands whose heights are changed may be existed.

What is claimed is:

1. An image-forming system comprising:
a band divider that divides an image data piece, which is an image data file of a complete image, into a plurality of bands each containing divided image data wherein for the image data piece the plurality of bands sequentially includes a first data band to a last data band of the divided image data, and the band divider is configured such that one data band of said first to last data bands has a one band data height different from a fixed height of remaining ones of the first to last data bands and is a height changed band;
a band memory,
a loader that loads the plurality of bands into the band memory in order of a direction orthogonal to a scanning direction of a print engine; and
an output unit that sequentially outputs the plurality of bands from the band memory to a print engine at predetermined timing;
the band memory including at least two main memories and an auxiliary memory, the at least two main memories sequentially storing fixed-height bands of said image data piece, the auxiliary memory storing only the height changed band of said image data piece to avoid a print overrun error attributable to said image data piece, the main memory being separate from the auxiliary memory such that data from the main memory can be output while data is stored in the auxiliary memory, wherein the main memory stores a same data type as the auxiliary memory, each of the main memory and the auxiliary memory storing bit-mapped data of a band representing a real image to directly control a print engine to print the image.

2. The system of claim 1, wherein:
said one data band is the last data band; and
the band divider sets an end of the image data file as an end boundary of the last data band for the image data piece, and the first data band to a second-to-last data band of said plurality of data bands reproduce the fixed height of a portion of the image which is different from a last band height reproduced by the last data band.

3. The system of claim 1, wherein:
the one data band height is equal to or lower than a threshold and the fixed height is greater than the threshold; and
the band memory loads the one data band into the auxiliary memory and the remaining ones of the first to last data bands are loaded into the main memory.

4. The system of claim 2, wherein:
the one data band height is equal to or lower than a threshold and the fixed height is greater than the threshold; and
the band memory loads the one data band into the auxiliary memory and the remaining ones of the first to last data bands are loaded into the main memory.

5. The system of claim 3, wherein:
the main memory includes two video memories each having a capacity of storing a band whose height is higher than the threshold among the bands; and
the auxiliary memory includes a video memory having a capacity of storing the one data band height.

6. The system of claim 4, wherein:
the main memory includes two video memories each having a capacity of storing a band whose height is higher than the threshold among the bands; and the auxiliary memory includes a video memory having a capacity of storing the one data band height.

7. The system of claim 1, wherein the loader carries out the loading to the main memory after the completion of the output from the main memory by the output unit to the print engine and carries out the loading the height changed band to the auxiliary memory after the loading of a preceding band of the remaining bands to the main memory.

8. The system of claim 2, wherein the loader carries out the loading to the main memory after the completion of the output from the main memory by the output unit to the print engine and carries out the loading the height changed band to the auxiliary memory after the loading of a preceding band of the remaining bands to the main memory.

9. The system of claim 3, wherein the loader carries out the loading to the main memory after the completion of the output from the main memory by the output unit to the print engine and carries out the loading the height changed band to the auxiliary memory after the loading of a preceding band of the remaining bands to the main memory.

10. The system of claim 4, wherein the loader carries out the loading to the main memory after the completion of the output from the main memory by the output unit to the print engine and carries out the loading the height changed band to the auxiliary memory after the loading of a preceding band of the remaining bands to the main memory.

11. The system of claim 5, wherein the loader carries out the loading to the main memory after the completion of the output from the main memory by the output unit to the print engine and carries out the loading the height changed band to the auxiliary memory after the loading of a preceding band of the remaining bands to the main memory.

12. The system of claim 6, wherein the loader carries out the loading to the main memory after the completion of the output from the main memory by the output unit to the print engine and carries out the loading the height changed band to the auxiliary memory after the loading of a preceding band of the remaining bands to the main memory.

* * * * *